United States Patent
Yamakawa et al.

(10) Patent No.: US 12,400,783 B2
(45) Date of Patent: Aug. 26, 2025

(54) TRANSFORMER INCLUDING FIRST AND SECOND WINDINGS, AND FIRST AND SECOND CORES, AND HAVING STRUCTURE FOR PREVENTING CORE CRACKING

(71) Applicant: Panasonic Intellectual Property Management Co., Ltd., Osaka (JP)

(72) Inventors: Takehiko Yamakawa, Osaka (JP); Hiromu Matsumoto, Osaka (JP); Susumu Nakamura, Kanagawa (JP); Yutaka Miyamoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 659 days.

(21) Appl. No.: 17/783,561

(22) PCT Filed: Dec. 10, 2020

(86) PCT No.: PCT/JP2020/046055
§ 371 (c)(1),
(2) Date: Jun. 8, 2022

(87) PCT Pub. No.: WO2021/117811
PCT Pub. Date: Jun. 17, 2021

(65) Prior Publication Data
US 2023/0028214 A1    Jan. 26, 2023

(30) Foreign Application Priority Data
Dec. 11, 2019    (JP) ................... 2019-223839

(51) Int. Cl.
*H01F 27/28* (2006.01)
*H01F 27/24* (2006.01)
(Continued)

(52) U.S. Cl.
CPC ............. *H01F 27/28* (2013.01); *H01F 27/24* (2013.01); *H01F 41/0206* (2013.01); *H01F 41/04* (2013.01); *H02J 7/0042* (2013.01)

(58) Field of Classification Search
CPC ..... H01F 27/28; H01F 41/0206; H02J 7/0042
(Continued)

(56) References Cited

U.S. PATENT DOCUMENTS 6,873,239 B2 * 3/2005 Decristofaro ....... H01F 1/15333
                                                    148/108
7,893,807 B2 * 2/2011 Sano ..................... H01F 3/12
                                                    336/212
(Continued)

FOREIGN PATENT DOCUMENTS

JP    S63-016412 U    2/1988
JP    2010-098207 A    4/2010
(Continued)

OTHER PUBLICATIONS

Extended European Search Report dated Jan. 5, 2023 issued in the corresponding European Patent Application No. 20898724.8.
(Continued)

*Primary Examiner* — Jack Chiang
*Assistant Examiner* — Suchin Parihar
(74) *Attorney, Agent, or Firm* — Rimon P.C.

(57) ABSTRACT

A transformer includes a primary winding, a secondary winding, a first core, and a second core. The primary winding and the secondary winding are inserted into the first core and the second core, and the first core and the second core are disposed to face each other. The first core includes one first core portion, and the second core includes a plurality of second core portions. The first core is a lower core, and the second core is an upper core. The first core and the second core are disposed to face each other with a gap (Continued)

interposed between the first core and the second core. The first core and the second core include a heat-resistant elastic body in the gap, and are disposed to face each other. Each of the second core portions is disposed with a heat-resistant elastic body interposed between the second core portions.

18 Claims, 15 Drawing Sheets

(51) Int. Cl.
*H01F 41/02* (2006.01)
*H01F 41/04* (2006.01)
*H02J 7/00* (2006.01)

(58) Field of Classification Search
USPC .......................................................... 320/107
See application file for complete search history.

(56) References Cited

U.S. PATENT DOCUMENTS

| | | | | |
|---|---|---|---|---|
| 8,138,744 | B2* | 3/2012 | Nagano | H01F 27/385 |
| | | | | 323/350 |
| 2001/0024142 | A1* | 9/2001 | Tan | H03L 7/1075 |
| | | | | 331/25 |
| 2003/0038696 | A1* | 2/2003 | Chui | H01F 38/10 |
| | | | | 336/198 |
| 2004/0085174 | A1 | 5/2004 | Decristofaro et al. | |
| 2008/0197953 | A1* | 8/2008 | Seong | H01F 27/2847 |
| | | | | 336/182 |
| 2010/0320982 | A1* | 12/2010 | Nagano | H01F 37/00 |
| | | | | 336/192 |
| 2013/0069751 | A1* | 3/2013 | Kim | H01F 27/29 |
| | | | | 336/192 |
| 2013/0321114 | A1* | 12/2013 | Lin | H01F 27/325 |
| | | | | 336/192 |
| 2017/0243693 | A1* | 8/2017 | Hatakeyama | H01F 27/325 |
| 2018/0174739 | A1* | 6/2018 | Nakajima | H01F 27/2876 |
| 2018/0197673 | A1* | 7/2018 | Njiende | H01F 3/10 |
| 2020/0163168 | A1* | 5/2020 | Salsich | H01F 38/14 |
| 2020/0258675 | A1* | 8/2020 | Jimenez Pino | H01F 27/306 |

FOREIGN PATENT DOCUMENTS

| | | |
|---|---|---|
| JP | 2011-077304 A | 4/2011 |
| JP | 2013-131540 A | 7/2013 |
| JP | 2014-093405 A | 5/2014 |
| JP | 2014-179516 A | 9/2014 |
| JP | 5974833 B2 | 8/2016 |

OTHER PUBLICATIONS

Decision of Refusal dated Dec. 3, 2024 issued in the corresponding Japanese Patent Application No. 2021-564028, with English machine translation.
International Search Report issued in International Patent Application No. PCT/JP2020/046055, mailed Mar. 16, 2021; with English translation.
International Preliminary Report on Patentability dated Jun. 23, 2022 issued in International Patent Application No. PCT/JP2020/046055, with English translation.
Notice of Reasons for Refusal dated Jul. 2, 2024 issued in the corresponding Japanese Patent Application No. 2021-564028, with English translation.
Chinese Office Action dated Mar. 27, 2025 issued in the corresponding Chinese Patent Application No. 202080085414.2, with English translation.

* cited by examiner

TRANSFORMER INCLUDING FIRST AND SECOND WINDINGS, AND FIRST AND SECOND CORES, AND HAVING STRUCTURE FOR PREVENTING CORE CRACKING

CROSS-REFERENCE OF RELATED APPLICATIONS

This application is the U.S. National Phase under 35 U.S.C. § 371 of International Patent Application No. PCT/JP2020/046055, filed on Dec. 10, 2020, which in turn claims the benefit of Japanese Patent Application No. 2019-223839, filed on Dec. 11, 2019, the entire disclosures of which Applications are incorporated by reference herein.

The present disclosure relates to a transformer used in a power converter circuit such as a DC to DC converter, a charging apparatus including the transformer, a power supply apparatus including the transformer, and a method of manufacturing the transformer.

BACKGROUND ART

Conventionally, an in-vehicle charging apparatus for charging a rechargeable battery from a commercial AC power supply is mounted on an electric vehicle or a plug-in hybrid vehicle. For example, Patent Document 1 and Patent Document 2 disclose such a charging apparatus. In this case, Patent Document 1 discloses a transformer in which an E-shaped core is vertically combined. In addition, Patent Document 2 discloses a transformer of an outer iron type in which an inner leg is divided from the center thereof and a heat sink is interposed therebetween.

PRIOR ART DOCUMENTS

Patent Documents

[Patent Document 1] Japanese Patent Laid-open Publication No. JP2013-131540A
[Patent Document 2] Japanese Patent No. JP5974833B2

SUMMARY OF THE INVENTION

Problems to be Solved by the Invention

However, in the transformers of Patent Documents 1 and 2, there is such a problem that core cracking occurs due to temperature change.

An object of the present disclosure is to provide a transformer capable of avoiding core cracking even when a temperature change occurs, a charging apparatus including the transformer, and a power supply apparatus including the transformer.

Means for Dissolving the Problems

According to the present disclosure, there is provided a transformer including a primary winding, a secondary winding, a first core, and a second core. The primary winding and the secondary winding are is into the first core and the second core, and the first core and the second core are disposed to face each other. The first core includes one first core portion, and the second core includes a plurality of second core portions.

Effect of the Invention

The transformer of the present disclosure can avoid core cracking even when a temperature occurs, which can enhance the reliability of the transformer.

MODE FOR CARRYING OUT THE INVENTION

Hereinafter, embodiments of the present disclosure will be described with reference to the drawings.

Problem of Comparison Example

Hereinafter, the transformer disclosed in Patent Document 1 is referred to as comparison example 1, the transformer disclosed in Patent Document 2 is referred to as comparison example 2, and the problems of these transformers will be described.

In a transformer in which E-shaped cores are vertically combined as in comparison example 1, the core in the longitudinal direction of the E-shaped core is disposed on the outermost side for a rapid temperature change such as a heat cycle test, and the core expands or contracts according to the thermal expansion coefficient of the core following the temperature change. In this case, the temperature change of the inner leg located inside the core delays because the inner leg has a large volume and is located inside, and core cracking occurs at the center of the core due to delay from expansion or contraction in the longitudinal direction of the E-shaped core, and the reliability decreases.

In addition, when a transformer in which the inner leg is divided from the center is applied to a transformer with built-in leakage in which a gap is arranged in an inner leg as in comparison example 2, the manufacturability deteriorates, the balance of the lower face mainly serving as the cooling face and the adhesion of the connection between the cores of an outer leg are not maintained, the stability of the inductance value and the cooling performance of the core are impaired, and the reliability of the transformer operation decreases.

Embodiments

Embodiments according to the present disclosure that solve the above problems will be described below. However, the configuration described below is merely an example of the present disclosure, the present disclosure is not limited to the following embodiments, and various modifications can be made according to the design and the like without departing from the technical idea according to the present disclosure even in a case other than these embodiments.

Figure 1:
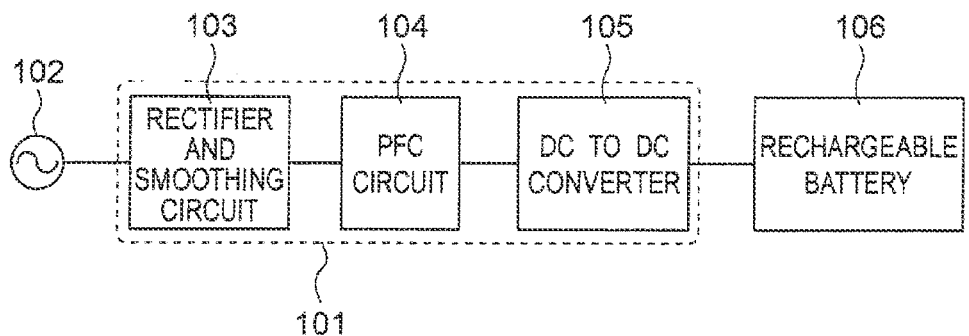
FIG. 1 is a block diagram illustrating a configuration example of an in-vehicle charging apparatus 101 according to an embodiment of the present disclosure.

FIG. 1 is a block diagram illustrating a configuration example of an in-vehicle charging apparatus 101 according to an embodiment of the present disclosure. The in-vehicle charging apparatus 101 of FIG. 1 is characterized in that AC power from a commercial AC power supply 102 is converted into DC power and outputted to a rechargeable battery 106, and a transformer 206 incorporated in a DC to DC converter 105 insulates before and after the conversion.

Referring to FIG. 1, the in-vehicle charging apparatus 101 includes a rectifier and smoothing circuit 103, a power factor correction circuit (PFC circuit) 104, and the DC to DC converter 105. In an electric vehicle or a plug-in hybrid vehicle, the rectifier and smoothing circuit 103 rectifies and smooths AC power from the commercial AC power supply 102 of 100 V or 200 V. Next, the PFC circuit 104 performs power factor correction on the input voltage that is rectified and smoothed, suppresses harmonics, and then outputs the voltage to the DC to DC converter 105. The DC to DC converter 105 converts the input DC voltage into a DC output voltage according to the battery voltage of the rechargeable battery 106 at the subsequent stage.

Figure 2:
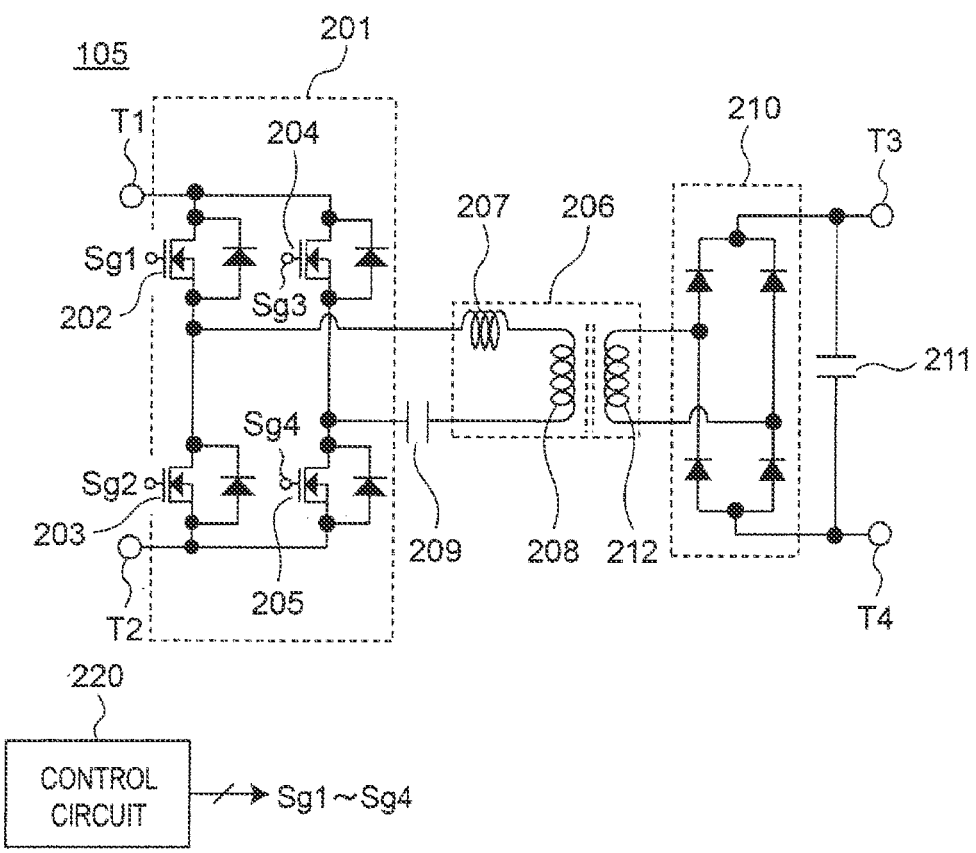
FIG. 2 is a circuit diagram illustrating a configuration example of an LLC resonant type DC to DC converter 105 in FIG. 1.

FIG. 2 is a circuit diagram illustrating a configuration example of the DC to DC converter 105 in FIG. 1. In the present embodiment, as an example, the DC to DC converter 105 of LLC resonant type widely used for a high-efficiency power supply, such as an industrial switching power supply, an in-vehicle charging apparatus, or a power converter, is used as the DC to DC converter.

Referring to FIG. 2, the LLC resonant type DC to DC converter 105 includes, between input terminals T1 and T2 and output terminals T3 and T4, an inverter circuit 201, a resonance capacitor 209, a transformer 206, a rectifying circuit 210, a smoothing capacitor 211, and a control circuit 220 that generates gate signals Sg1 to Sg4 for controlling the operation of the inverter circuit 201. In this case, the inverter circuit 201 is configured by connecting, for example, N-channel MOS transistors 202 to 205 as switching elements in a bridge format and converts a DC voltage into an AC voltage by turning on or off the MOS transistors 202 to 205 according to the gate signals Sg1 to Sg4. In addition, the transformer 206 includes a leakage inductance 207, an excitation inductance 208 of a primary winding, and an inductance 212 of a secondary winding.

In the DC to DC converter 105, the inverter circuit 201 converts an input voltage into an AC voltage by switching the input voltage, and outputs the AC voltage to the rectifying circuit 210 via the resonance capacitor 209 and the transformer 206. In this case, the output voltage is changed by using a frequency modulation method of changing the switching frequency of the four MOS transistors 202 to 205 using the resonance of the two inductances and one capacitor of the leakage inductance 207 and the excitation inductance 208 of the transformer 206 and the resonance capacitor 209. Next, the output voltage from the transformer 206 is rectified by the rectifying circuit 210 and smoothed by the smoothing capacitor 211, and then a DC voltage is outputted.

The DC to DC converter 105 configured as described above can reduce the switching loss with the 0-voltage switching, can reduce the surge current and the voltage with the switching current close to the sine wave, and can reduce the noise.

Figure 3:
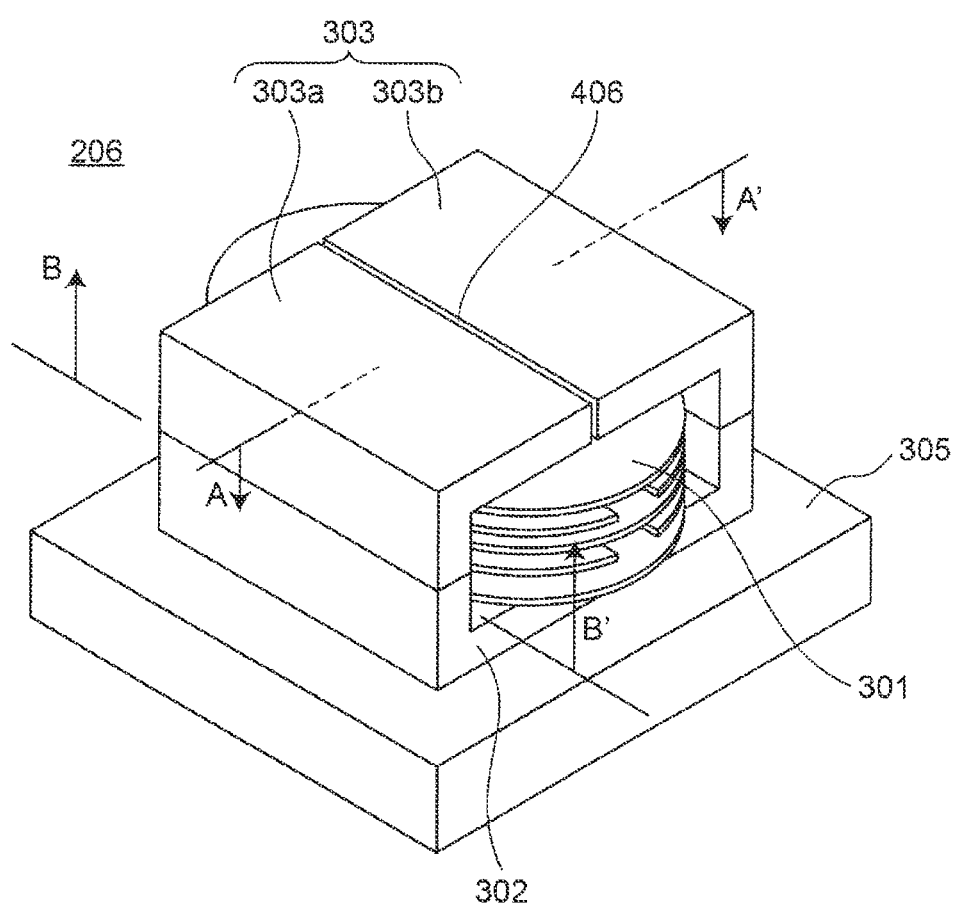
FIG. 3 is a perspective view illustrating an appearance of a transformer 206 in
FIG. 2.
Figure 4A:
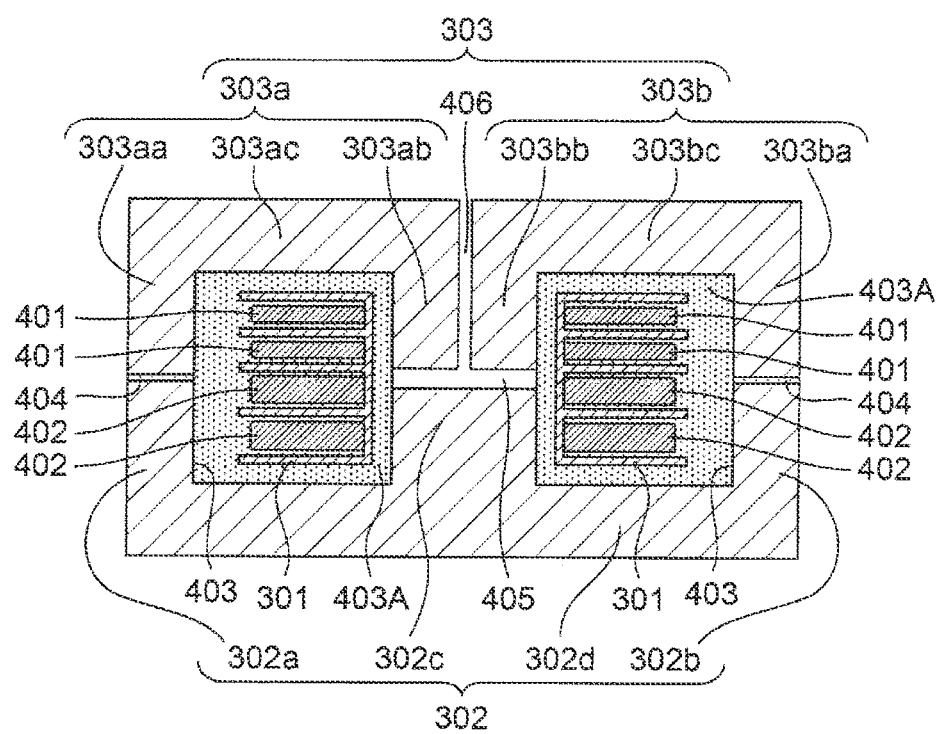
FIG. 4A is a longitudinal sectional view taken along the line A-A' in FIG. 3.
Figure 4B:
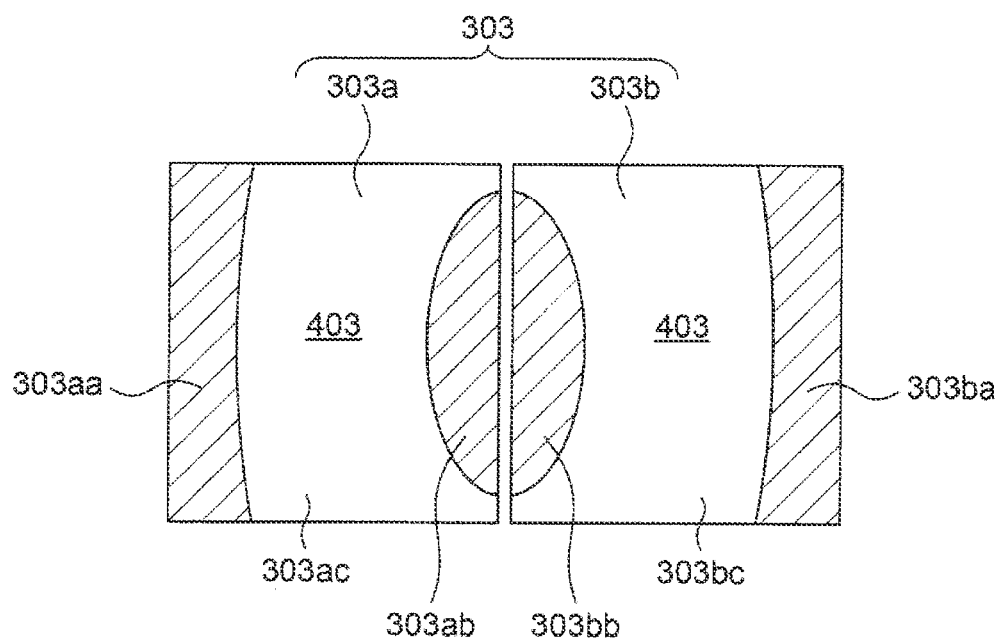
FIG. 4B is a transverse sectional view taken along the line B-B' in FIG. 3.

FIG. 3 is a perspective view illustrating an appearance of the transformer 206 in FIG. 2, FIG. 4A is a longitudinal sectional view taken along the line A-A' in FIG. 3, and FIG. 4B is a transverse sectional view taken along the line B-B' in FIG. 3. The upper, lower, left, and right in FIGS. 3, 4A, and 4B will be described as the upper, lower, left, and right directions, but it is not intended to limit the use form of the transformer 206. As illustrated in FIG. 3, the manufactured transformer 206 is placed on an air-cooling or water-cooling cooling apparatus 305.

Referring to FIGS. 3 and 4A, the transformer 206 includes a lower core 302 which is an E-shaped core constituting one core portion, two core portions 303a and 303b of an upper core 303 which are U-shaped cores, and a bobbin 301 formed between the lower core 302 and the upper core 303 and inserted into a closed magnetic path region 403 formed by the lower core 302 and the upper core 303. In this case, a primary winding 401 and a secondary winding 402 are wound around the grooves of the bobbin 301 such that the central axis of the closed magnetic path region 403 becomes the winding axis. It is noted that in the present embodiment, each core 302, 303 is constituted of, for example, a ferrite core. In addition, the bobbin 301 is made of an insulator material such as a polyphenylene sulfide resin.

The lower core 302 is constituted of an E-shaped core including two outer legs 302a and 302b, one inner leg 302c, and a bottom face portion 302d for supporting them. In this case, the inner leg 302c is disposed so as to be inserted into the closed magnetic path region 403. It is noted that the closed magnetic path region 403 penetrates in the horizontal direction parallel to a core end face.

The upper core 303 is constituted of a core portion 303a which is a U-shaped core and a core portion 303b which is a U-shaped core. The core portion 303a includes an outer leg 303aa, an inner leg 303ab, and a bottom face portion 303ac for supporting them. In addition, the core portion 303b includes an outer leg 303ba, an inner leg 303bb, and a bottom face portion 303bc for supporting them.

Each of the core portion 303a and the core portion 303b of the upper core 303 is disposed so as to face the lower core 302 as follows.

(1) The end face of the outer leg 303aa of the core portion 303a is disposed to face the end face of the outer leg 302a of the lower core 302, and the end faces are adhered to each other with an adhesive.

(2) The end face of the outer leg 303ba of the core portion 303b is disposed to face the end face of the outer leg 302b of the lower core 302, and the end faces are adhered to each other with an adhesive.

(3) The respective end surfaces of the inner leg 303ab of the core portion 303a and the inner leg 303bb of the core portion 303b are separated with a predetermined gap 405 interposed therebetween and are disposed so as to face the end face of the inner leg 302c of the lower core 302.

(4) It is noted that the two core portions 303a and 303b are disposed to be separated from each other with a predetermined gap 406 interposed therebetween and face each other in the transverse face direction.

In this case, the inner leg 302c of the lower core 302 inserted into the closed magnetic path region 403 and the inner legs 303ab and 303bb of the two core portions 303a and 303b inserted into the closed magnetic path region 403 of the upper core 303 are separated with a gap 405 interposed therebetween and disposed to face each other as described above. By adjusting the gap 405, the excitation inductance 208 constituting the resonance frequency of the LLC resonant type DC to DC converter 105 can be adjusted. In addition, the leakage inductance 207 is adjusted by the distance between the primary winding 401 and the secondary winding 402, where the thickness of the bobbin between the primary winding 401 and the secondary winding 402, the difference in the number of windings of the primary winding 401 constituted of two stages in the upper and lower grooves, the difference in the number of windings of the secondary winding 402 constituted of two stages in the upper and lower grooves, and the like.

Further, it can be understood that the outer legs 303aa, 303ba and the inner legs 303ab and 303bb protrude downward from the bottom face portions 303ac, 303bc, respectively, and the closed magnetic path regions 403 are formed between the outer leg 303aa and the inner leg 303ab and between outer leg 303ba and the inner leg 303bb, respectively, in the transverse section seen in the upward direction in FIG. 4B. It is noted that the closed magnetic path region 403 is filled with a filler 403A made of, for example, an insulating material such as a silicone filler, at the end of the manufacturing step of the entire core. At this time, the filler 403A may also enter the gap 405 and the gap 406.

It is noted that a lead wire, a bobbin cover for securing an insulation distance between the core and the winding, a mechanism for positioning the bobbin and the core, and the like which are disposed in a common transformer are not illustrated in the drawings, but they may be appropriately added.

Further, the in-vehicle charging apparatus 101 is provided with the cooling apparatus 305 (FIG. 3) such as a water-cooling apparatus or an air-cooling apparatus to release heat and cool each component. The cooling apparatus 305 is disposed below the transformer 206 to release heat generated by the transformer 206. At this time, flatness with the bottom face of the lower core 302 greatly affects heat release property. At this time, normally, when each of the cores 302 and 303 generates heat, the cooling apparatus 305 cools the lower core 302, the upper core 303 is less likely to release heat as compared with the lower core 302 and thus the upper core 303 is hotter than the lower core 302, and a temperature difference occurs between the upper and lower cores 302 and 303.

Figure 5:
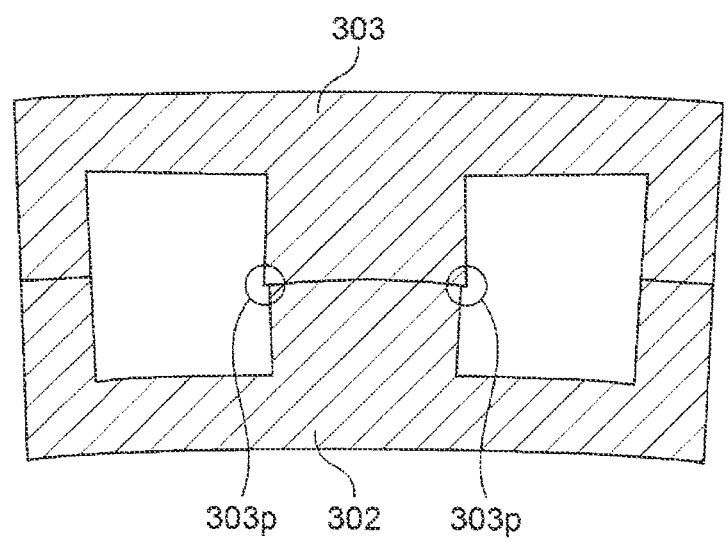
FIG. 5 is a longitudinal sectional view displaying an enlarged distortion generated in a core when a temperature difference occurs between upper and lower cores of a transformer according to a conventional example.

FIG. 5 is a longitudinal sectional view displaying an enlarged distortion generated in each core 302 and 303 when a temperature difference occurs between the upper and lower cores 302 and 303 of a transformer where the upper core 303 is not divided into two portions according to a conventional example. FIG. 5 illustrates a result obtained by enlarging and displaying the analysis result of the distortion generated in the cores 302 and 303 when a temperature difference occurs between the upper and lower cores 302 and 303 like this in an E-shaped core of the conventional example. In this case, the bobbin 301, the primary winding 401, and the secondary winding 402 are not illustrated.

As is clear from FIG. 5, the upper core 303 is deformed convexly upward by the thermal expansion coefficient of the core 303, and a tensile stress is applied to the outside. This can also be seen from the fact that the thickness of the inner leg of the upper core 303 which had the same size as the thickness of the inner leg of the lower core 302 at the same temperature is thicker than the thickness of the inner leg of the lower core 302 as indicated by the reference character 303p. When such a stress is applied, core cracking may occur in the E-shaped core of the conventional example, but the core portion 303a which is a U-shaped core and the core portion 303b which is a U-shaped core are separated from each other as in the configuration of the present embodiment, which can release the stress and reduce core cracking.

Many in-vehicle passive components are required to comply with the tests defined by the Automotive Electronics Council (AEC), and one of them is a heat cycle test, and resistance to a rapid temperature change is also required. In the upper and lower E-shaped cores of the conventional example, the temperature change of the inner leg located inside the core delays because the inner leg has a large volume and is located inside, and core cracking may occur at the center of the core due to delay from expansion or contraction in the longitudinal direction of the E-shaped core located outside. However, by dividing the upper core 303 into the two core portions 303a and 303b which are U-shaped cores as in the configuration of the present embodiment, the volume of the inner leg decreases, and the heat around the inner leg portion is easily transferred to the inner leg due to the gap between the U-shaped cores, and core cracking is less likely to occur. In addition, even when stress occurs, the stress is reduced by the division at the center, and core cracking is less likely to occur.

In the present embodiment, since the transformer 206 of the LLC resonant type DC to DC converter 105 has the gap 405 (FIG. 4A), the actual manufacturing method needs to be devised. In particular, when the outer legs of the upper core 303 and the lower core 302 are adhered to each other, for example when an epoxy-based adhesive 404 is used to adhere the outer legs as illustrated in FIG. 4A, the adhesive 404 may be peeled off due to the gap 405, or a gap which is not intended when designed may be formed between the outer legs (303aa and 302a) (303ba and 302b) of the upper core 303 and the lower core 302, and the inductance may decrease from a desired inductance.

Figure 6:
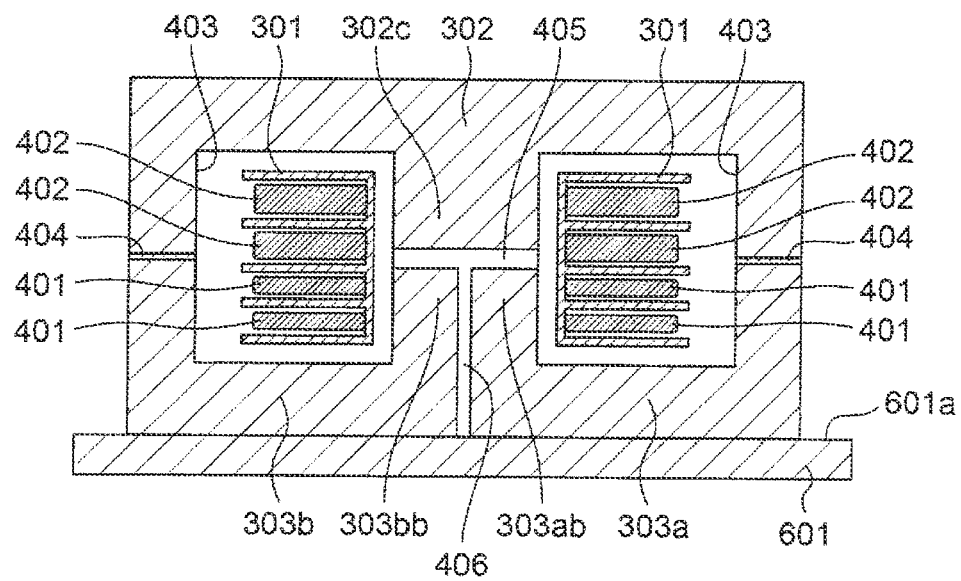
FIG. 6 is a longitudinal sectional view when the transformer 206 in FIG. 1 is fixed with an adhesive 404.

FIG. 6 is a longitudinal sectional view when the transformer 206 in FIG. 1 is fixed with the adhesive 404.

To solve the above problem, it is possible to realize a desired configuration by vertically inverting the transformer 206 at the time of adhering, disposing the upper core 303 including the core portions 303a and 303b which are two U-shaped cores on the upper side, disposing the lower core 302 on the lower side, and fixing the outer legs (303aa and 302a) (303ba and 302b) of the upper core 303 and the lower core 302 with the adhesive 404 as illustrated in FIG. 6.

In addition, since the inner legs of the upper core 303 and the lower core 302 in FIG. 5 are separated by the gap, there is a difference in the inner leg thickness deformation between the upper and lower sides. However, if the inner legs are fixed, stress occurs in the core 302 and 303 against deformation so as not to follow the deformation between the upper and lower cores. That is, it is possible to further relax the stress of the cores by not fixing the outer legs of the upper core 303 and the lower core 302 with the adhesive 404. Therefore, a method of fixing them with an adhesive tape is conceivable, but if the gap 405 is provided, it may be difficult to wind the adhesive tape in the form of FIG. 4A and the like.

Figure 7A:
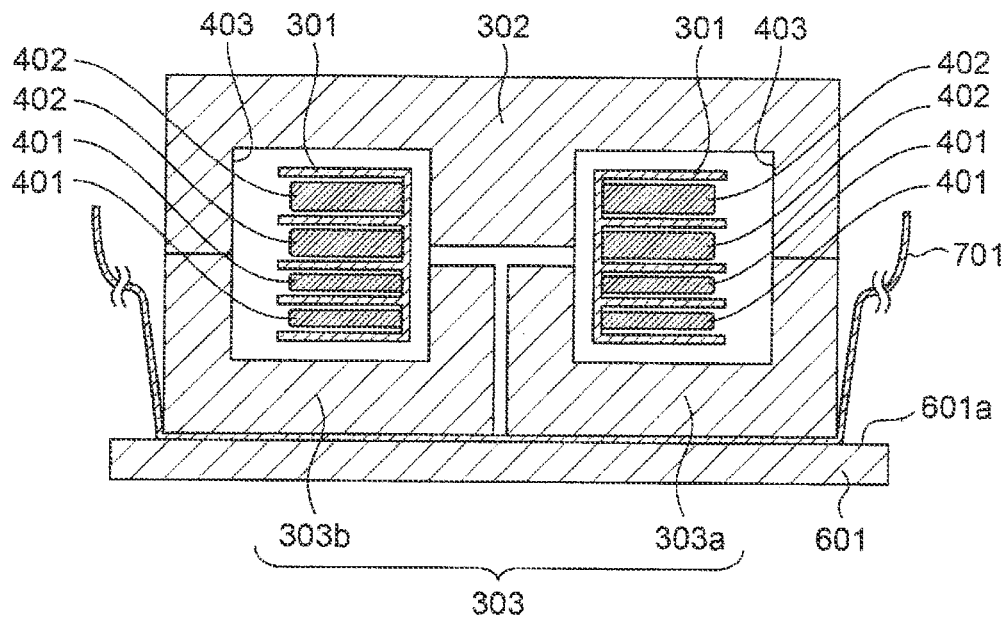
FIG. 7A is a longitudinal sectional view when the transformer 206 in FIG. 2 is being fixed with an adhesive tape 701.
Figure 7B:
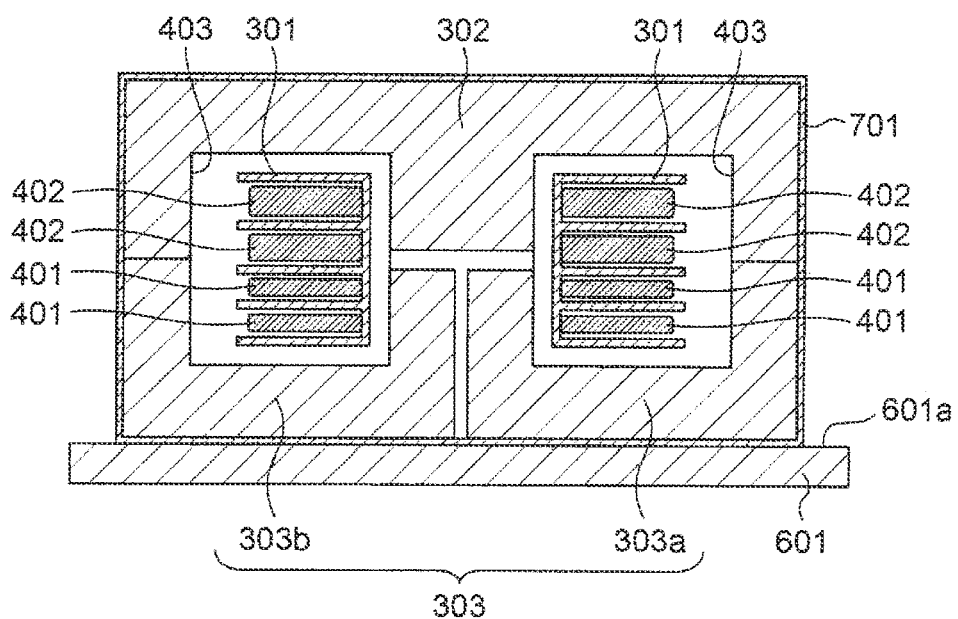
FIG. 7B is a longitudinal sectional view when the entire circumference of the transformer 206 in FIG. 2 is fixed with the adhesive tape 701.
Figure 7C:
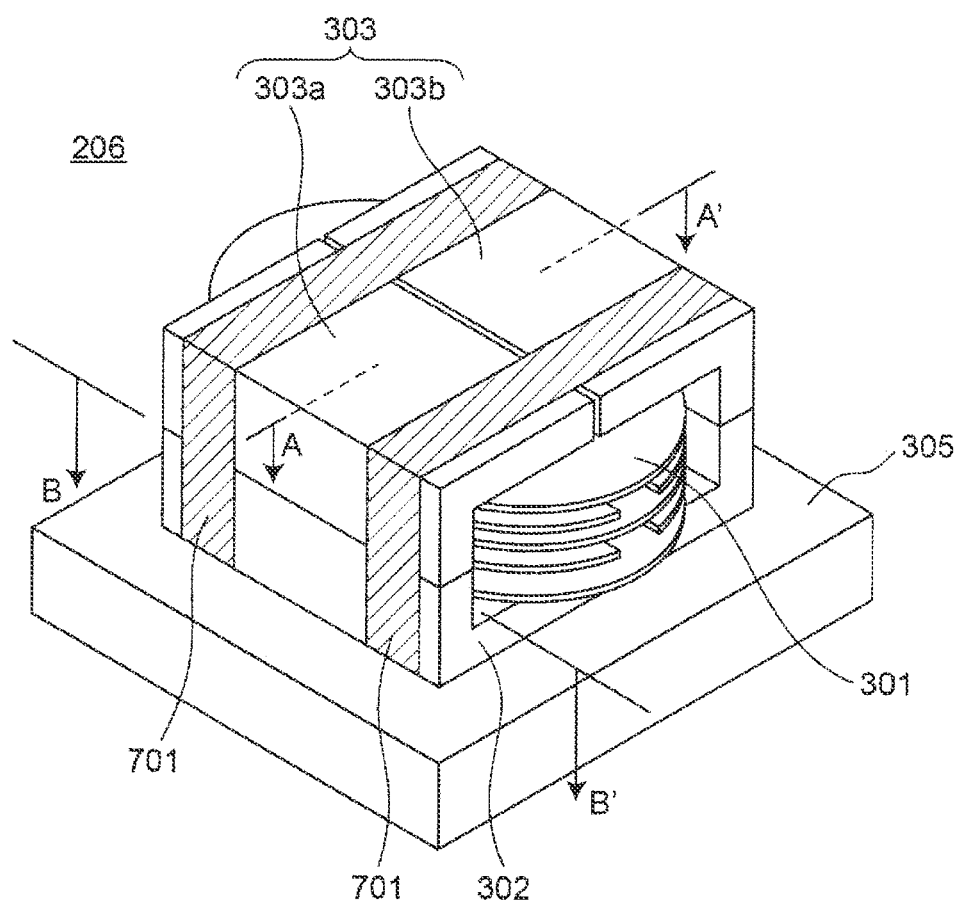
FIG. 7C is a perspective view illustrating an appearance when the entire circumference of the transformer 206 in FIG. 2 is fixed with the adhesive tape 701.

FIG. 7A is a longitudinal sectional view when the transformer 206 in FIG. 2 is fixed with an adhesive tape 701. FIG. 7B is a longitudinal sectional view when the entire circumference of the transformer 206 in FIG. 2 is fixed with the adhesive tape 701, and FIG. 7C is a perspective view illustrating an appearance when the entire circumference of the transformer 206 in FIG. 2 is fixed with the adhesive tape 701. In this case, the adhesive tape 701 is an insulating fixing tape for fixing an electric component, such as Kapton (registered trademark) tape manufactured by DuPont, for example.

To solve the above problem, as illustrated in FIG. 7A, when the fixing is performed with the adhesive tape 701, the adhesive tape 701 is disposed on a flat face 601a of a placing table 601, the upper and lower sides of the transformer 206 are reversed, and the core portions 303a and 303b of the upper core 303 which are two U-shaped cores are disposed on the lower side and fixed on the adhesive tape 701. Next, the bobbin 301 around which the primary winding 401 and the secondary winding 402 are wound is inserted and disposed in the closed magnetic path region 403 of the upper core 303, and covered with the lower core 302, and finally the entire core is wound around and fixed with the adhesive tape 701, which can realize the desired configurations of FIGS. 7B and 7C.

Figure 8:
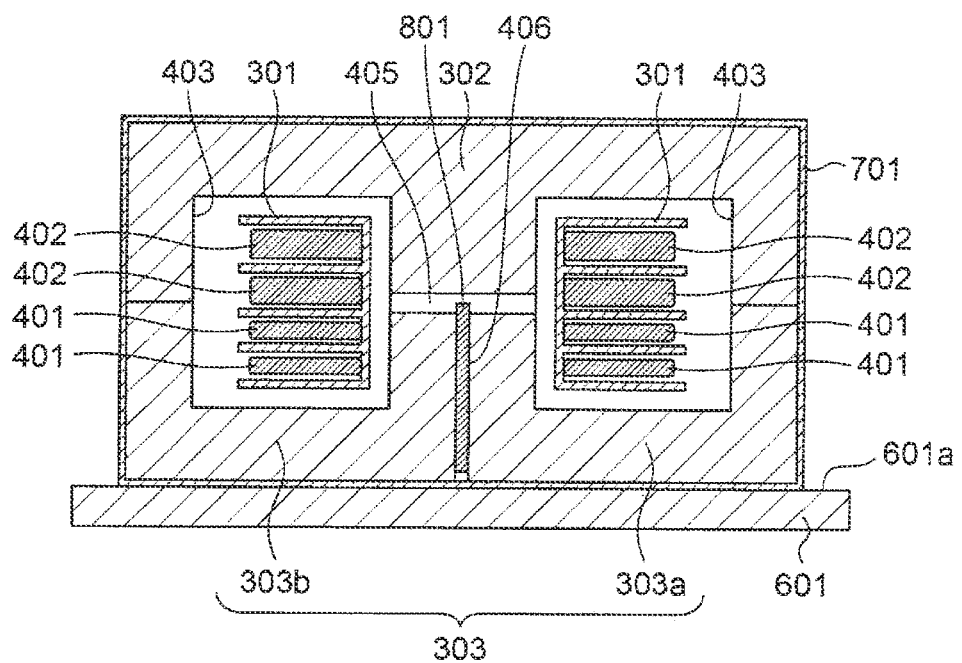
FIG. 8 is a longitudinal sectional view when core portions 303a and 303b which are U-shaped cores of the transformer 206 in FIG. 2 are fixed with the adhesive tape 701 with a heat-resistant elastic body 801 interposed therebetween.

FIG. 8 is a longitudinal sectional view when the core portions 303a and 303b which are two U-shaped cores of the transformer 206 of FIG. 2 are fixed with the adhesive tape 701 with a heat-resistant elastic body 801 interposed therebetween.

Although the gap 405 is interposed between the core portions 303a and 303b which are two U-shaped cores, the heat-resistant elastic body 801 having a heat insulating action may be interposed in the gap 405, the transformer 206 is vertically inverted in a manner similar to that of FIG. 7, and the transformer 206 may be fixed with the adhesive tape 701 as illustrated in FIG. 8. As a result, the heat-resistant elastic body 801 absorbs the stress due to the temperature difference between the upper core 303 and the lower core 302, and it is possible to construct a stable transformer structure. It is noted that the heat-resistant elastic body 801 is, a so-called gap filler having a sheet shape, for example and is made of an insulating resin such as a silicone resin.

Figure 9:
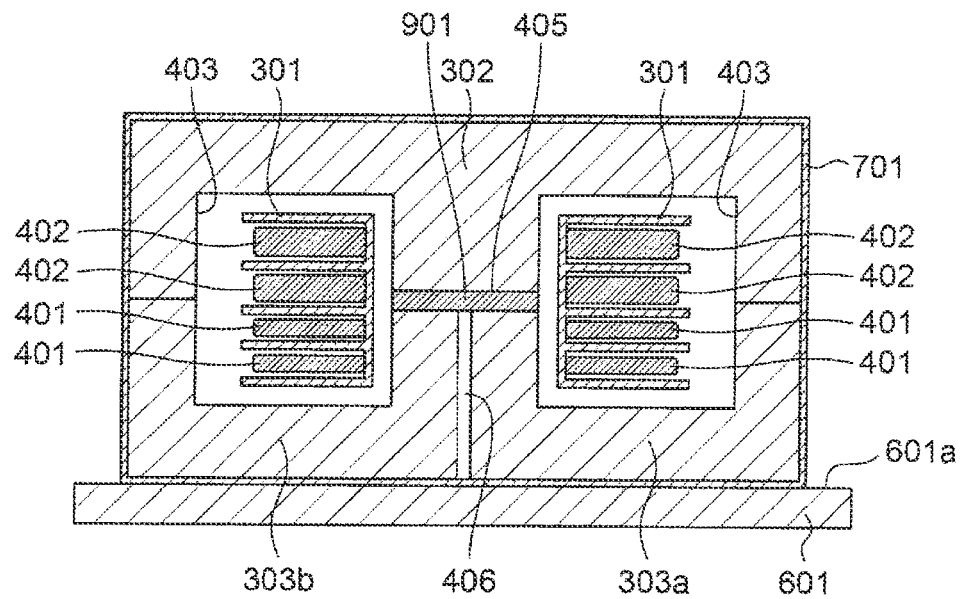
FIG. 9 is a longitudinal sectional view when the core portions 303a and 303b which are two U-shaped cores and a lower core 302 which is an E-shaped core of the transformer 206 in FIG. 2 are fixed with the adhesive tape 701 with a heat-resistant elastic body 901 interposed therebetween.

FIG. 9 is a longitudinal sectional view when the core portions 303a and 303b which are two U-shaped cores and the lower core 302 which is an E-shaped core of the transformer 206 in FIG. 2 are fixed with the adhesive tape 701 with a heat-resistant elastic body 901 interposed therebetween.

Further, as illustrated in FIG. 9, a stable transformer structure can be constructed by interposing the heat-resistant elastic body 901 having a heat insulating action in the gap 405, vertically inverting the transformer 206 in a manner similar to that of FIG. 7, and fixing the transformer 206 with the adhesive tape 701. It is noted that the heat-resistant elastic body 901 is, a so-called gap filler having a sheet shape, for example and is made of an insulating resin such as a silicone resin. The heat-resistant elastic body 801 in FIG. 8 and the heat-resistant elastic body 901 in FIG. 9 may be formed together.

As described above, the transformer 206 according to the present embodiment can reduce the stress on the upper core 303 by dividing the upper core 303 into two portions and constituting the lower core 302 of an E-shaped core. As a result, even when a rapid temperature change occurs, a delay in temperature change of the inner legs is reduced between the U-shaped cores to prevent core cracking, and even when the gap 406 is disposed between the inner legs, it is possible to enhance the adhesion between the cores of the outer legs while maintaining the flatness of the lower face of the core and enhancing the heat release property from the lower face of the core, and to enhance the electrical stability such as inductance and the manufacturability of the transformer. This can enhance the reliability.

Modified Embodiment 1

Figure 10:
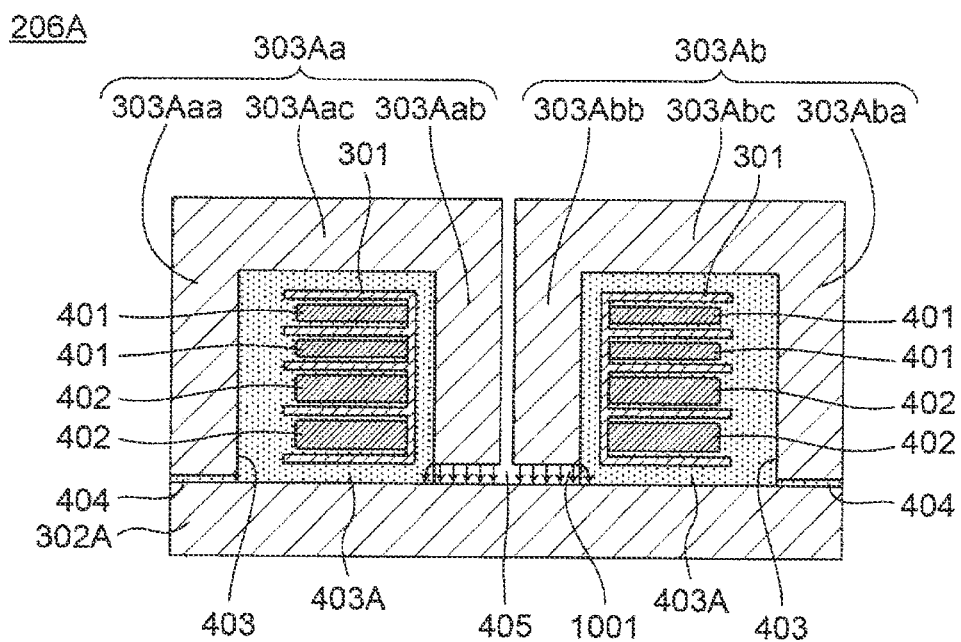
FIG. 10 is a longitudinal sectional view illustrating a configuration example of a transformer 206A according to modified embodiment 1, the transformer 206A including one I-shaped core 302A and two U-shaped cores 303Aa and 303Ab.

FIG. 10 is a longitudinal sectional view illustrating a configuration example of a transformer 206A according to modified embodiment 1, the transformer 206A including one I-shaped core 302A and two U-shaped cores 303Aa and 303Ab.

The core configuration of the embodiment is constituted of one E-shaped core and two U-shaped cores facing the E-shaped core, but the core configuration may be constituted of one I-shaped core 302A and U-shaped cores 303Aa and 303Ab constituting two core portions and facing the one I-shaped core as in modified embodiment 1 of FIG. 10. In this case, the U-shaped core 303Aa includes an outer leg 303Aaa, an inner leg 303Aab, and a bottom face portion 303Aac that supports them. In addition, the U-shaped core 303Ab includes an outer leg 303Aba, an inner leg 303Abb, and a bottom face portion 303Abc that supports them.

In modified embodiment 1 configured as described above, the heat dissipation and the stress relaxation of the core can be realized in a manner similar to that of the embodiment, and further, since the gap 405 is located on the bottom end face of the inner legs 303Aab, 303Abb, a leakage magnetic flux 1001 generated in the gap 405 is far from the primary winding 401 and the secondary winding 402, the leakage magnetic flux 1001 interlinks the primary winding 401 and the secondary winding 402, and an eddy current loss to occur can also be reduced.

Modified Embodiment 2

Figure 11:
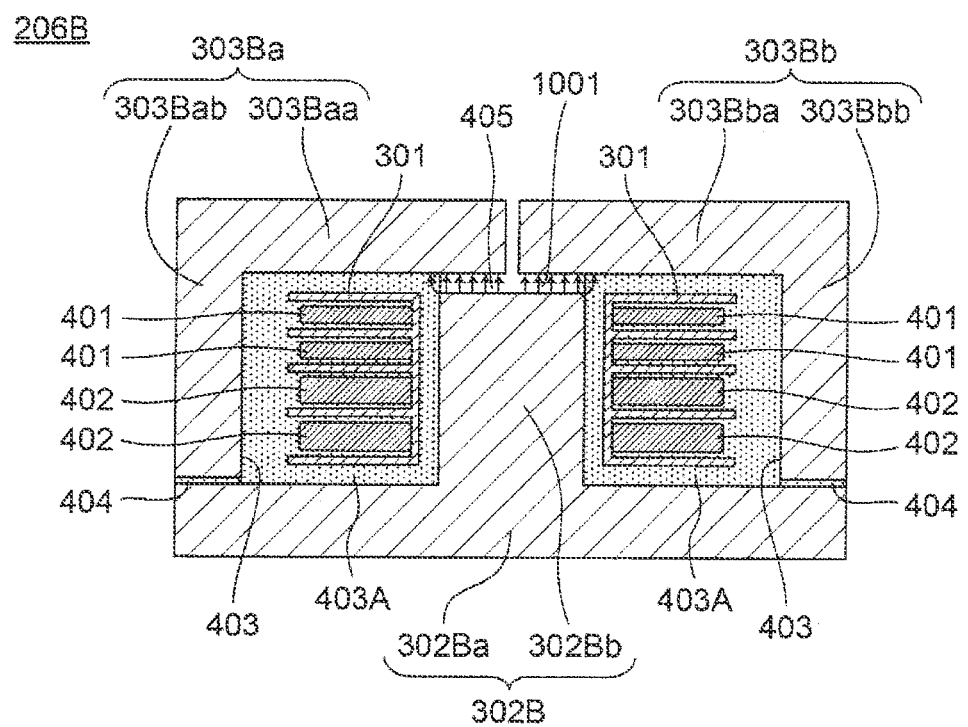
FIG. 11 is a longitudinal sectional view illustrating a configuration example of a transformer 206B according to modified embodiment 2, the transformer 206B including one T-shaped core 302B and two L-shaped cores 303Ba and 303Bb.

FIG. 11 is a longitudinal sectional view illustrating a configuration example of a transformer 206B according to modified embodiment 2, the transformer 206B including one T-shaped core 302B and two L-shaped cores 303Ba and 303Bb.

In modified embodiment 2 of FIG. 11, the core configuration may be constituted of one T-shaped core 302B and two L-shaped cores 303Ba and 303Bb facing the T-shaped core. In this case, the T-shaped core 302B includes an inner leg 302Bb and a bottom face portion 302Ba that supports the inner leg 302Bb. In addition, the L-shaped core 303Ba includes an outer leg 303Bab and a bottom face portion 303Baa that supports the outer leg 303Bab. Further, the L-shaped core 303Bb includes an outer leg 303Bbb and a bottom face portion 303Bba that supports the outer leg 303Bbb.

In modified embodiment 2 configured as described above has the same effects as that of modified embodiment 1.

Next, a process of the method of manufacturing the transformer 206 of FIGS. 6 and 7C will be described below.

Process Example 1 of Manufacturing Method

FIGS. 12A to 12E are longitudinal sectional views illustrating each process of the manufacturing step of the transformer 206 of FIG. 6.

Figure 12A:
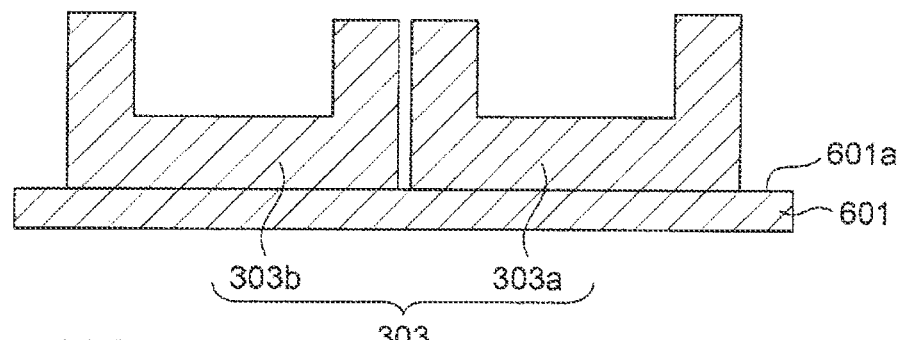
FIG. 12A is a longitudinal sectional view illustrating a first process in a manufacturing step of the transformer 206 in FIG. 6.
Figure 12B:
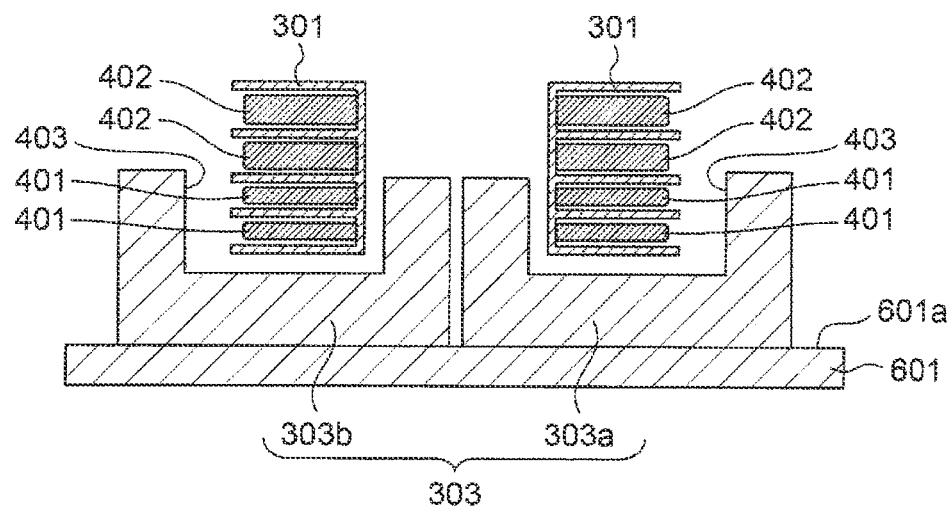
FIG. 12B is a longitudinal sectional view illustrating a second process in the manufacturing step of the transformer 206 in FIG. 6.
Figure 12C:
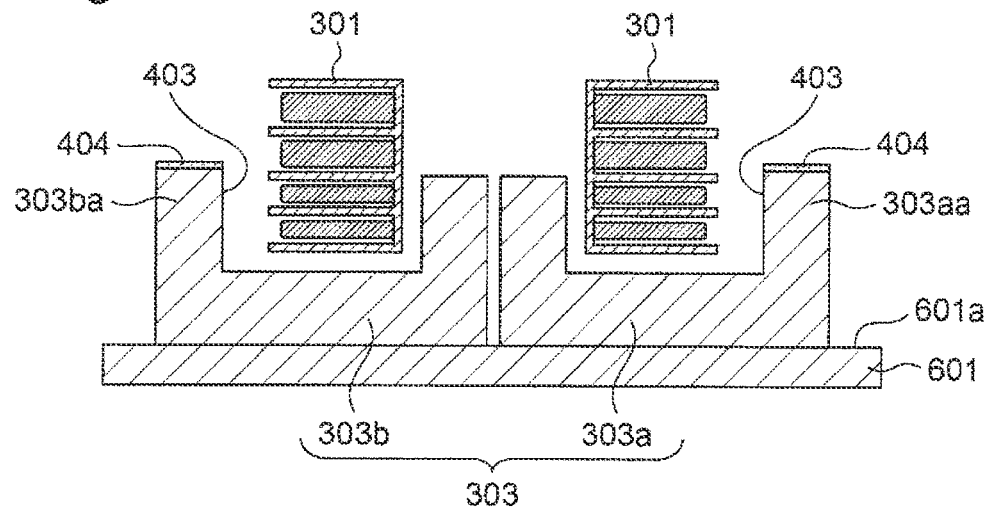
FIG. 12C is a longitudinal sectional view illustrating a third process in the manufacturing step of the transformer 206 in FIG. 6.
Figure 12D:
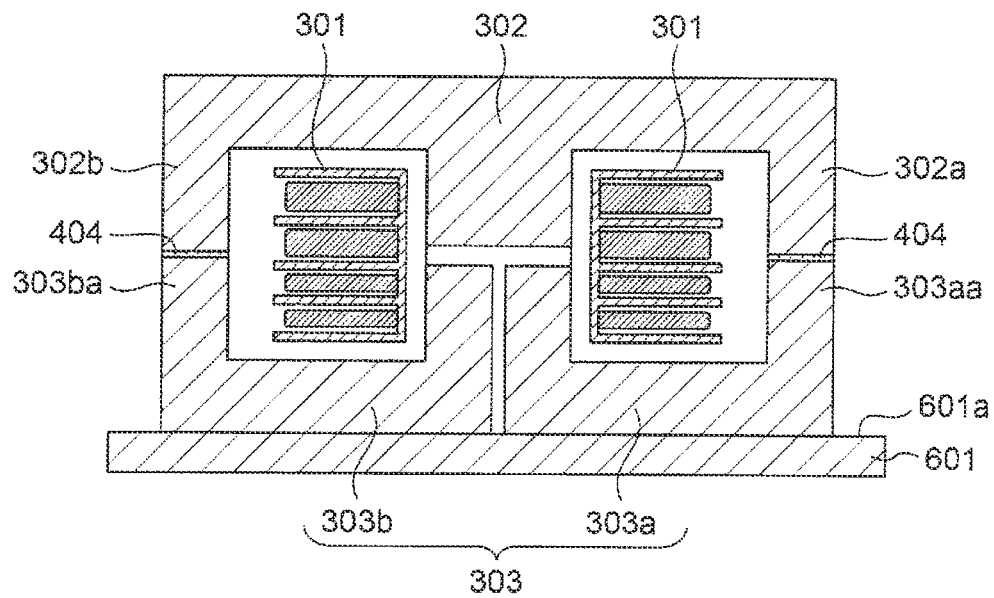
FIG. 12D is a longitudinal sectional view illustrating a fourth process in the manufacturing step of the transformer 206 in FIG. 6.
Figure 12E:
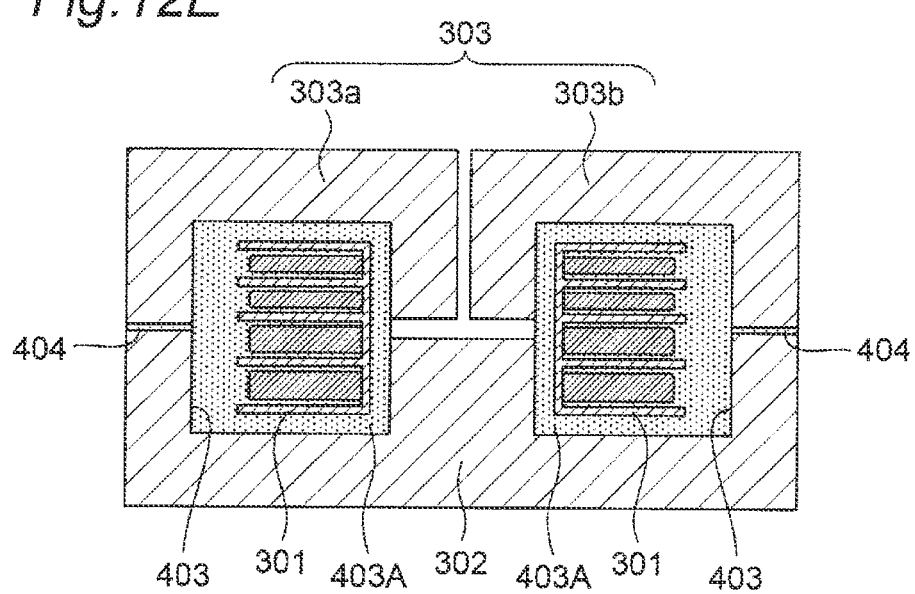
FIG. 12E is a longitudinal sectional view illustrating a fifth process in the manufacturing step of the transformer 206 in FIG. 6.

As illustrated in FIG. 12A, the core portions 303a and 303b of the upper core 303 which are two U-shaped cores are disposed and fixed on the lower side on the flat face 601a of the placing table 601. Next, as illustrated in FIG. 12B, the bobbin 301 around which the primary winding 401 and the secondary winding 402 are wound is inserted into the closed magnetic path region 403 of the upper core 303. Further, as illustrated in FIG. 12C, the adhesive 404 is applied to the end faces of the outer legs 303aa, 303ba of the core portions 303a and 303b. Next, as illustrated in FIG. 12D, the lower core 302 is disposed to cover the end faces of the outer legs 303aa, 303ba of the core portions 303a and 303b such that the end faces of the outer legs 302a, 302b of the lower core 302 face the end faces of the outer legs 303aa, 303ba, respectively, and the lower core 302 and the upper core 303 are adhered and fixed. Finally, as illustrated in FIG. 12E, the transformer 206 to be manufactured is obtained by vertically inverting the transformer that is a combined product in which the lower core 302 and the upper core 303 are combined, thereafter installing the transformer 206 in a predetermined case (not illustrated), pouring and curing the filler 403A, and filling the closed magnetic path region 403 with the filler 403A to fix the bobbin 301. In this case, since the transformer 206 generates heat not only in the upper and lower cores 302, 303 but also in the windings 401, 402, the entire transformer 206 is housed in a predetermined case, and the inside of the case is filled with potting made of silicone resin or the like, to release heat of the winding 401, 402 and the upper and lower cores 302, 303 to the cooling apparatus 305 or the like below the transformer through the potting.

Process Example 2 of Manufacturing Method

FIGS. 13A to 13E are longitudinal sectional views illustrating each process of the manufacturing step of the transformer 206 of FIG. 7C.

Figure 13A:
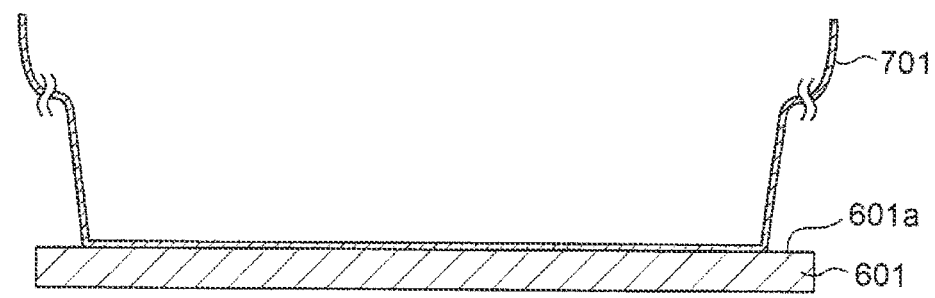
FIG. 13A is a longitudinal sectional view illustrating a first process in a manufacturing step of the transformer 206 in FIG. 7C.
Figure 13B:
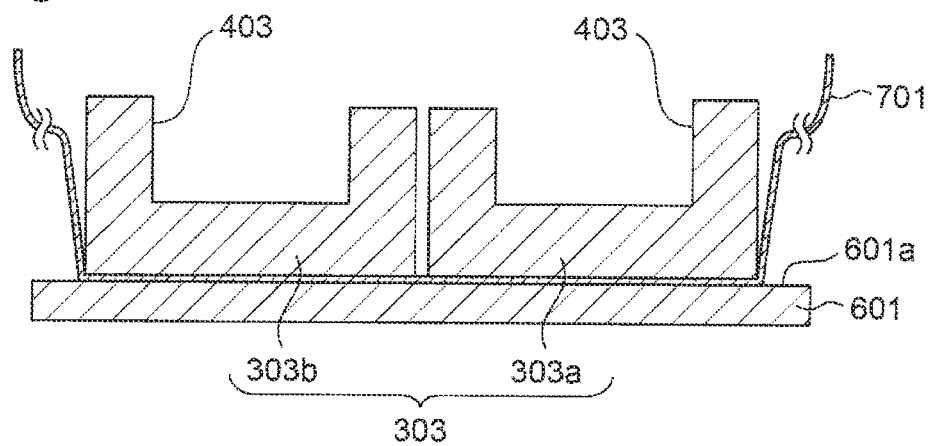
FIG. 13B is a longitudinal sectional view illustrating a second process in the manufacturing step of the transformer 206 in FIG. 7C.
Figure 13C:
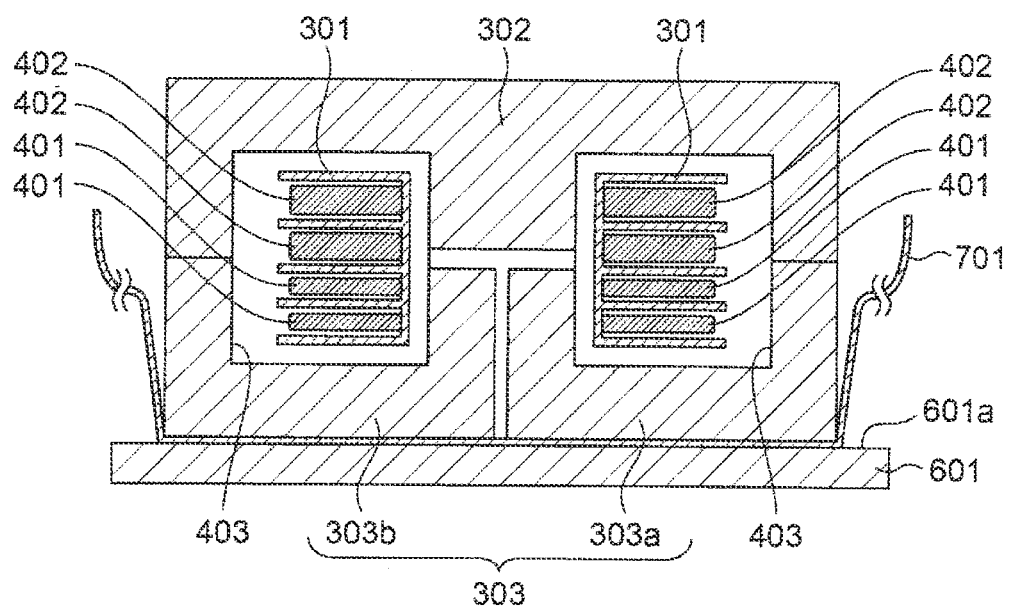
FIG. 13C is a longitudinal sectional view illustrating a third process in the manufacturing step of the transformer 206 in FIG. 7C.
Figure 13D:
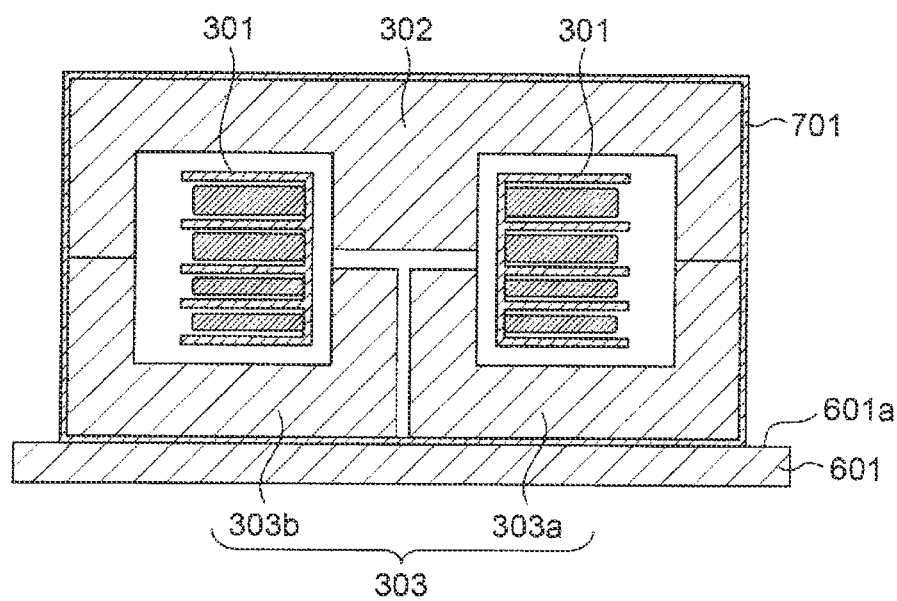
FIG. 13D is a longitudinal sectional view illustrating a fourth process in the manufacturing step of the transformer 206 in FIG. 7C.
Figure 13E:
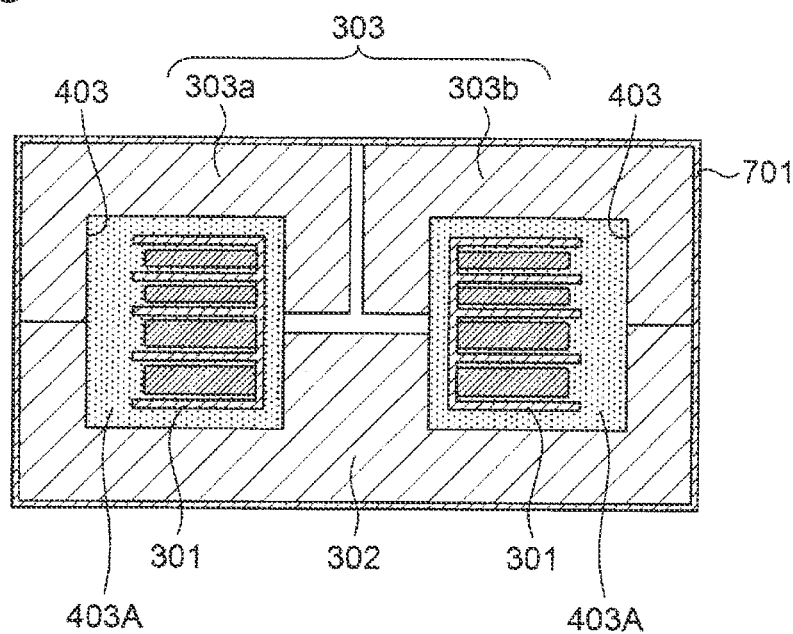
FIG. 13E is a longitudinal sectional view illustrating a fifth process in the manufacturing step of the transformer 206 in FIG. 7C.

After the adhesive tape 701 is fixed on the flat face 601a of the placing table 601 as illustrated in FIG. 13A, the core portions 303a and 303b of the upper core 303 which are two U-shaped cores are disposed and fixed on the lower side on the adhesive tape 701 as illustrated in FIG. 13B. Next, as illustrated in FIG. 13C, the bobbin 301 around which the primary winding 401 and the secondary winding 402 are wound is inserted and disposed in the closed magnetic path region 403 of the upper core 303, and then the lower core 302 is disposed to cover the end faces of the outer legs 303aa and 303ba of the core portions 303a and 303b such that the end faces of the outer legs 302a, 302b of the lower core 302 face the end faces of the outer legs 303aa and 303ba. Finally, as illustrated in FIG. 13D, the transformer 206 to be manufactured is obtained by fixing the outer legs and the outer periphery of the bottom face portion of the combined product in which the lower core 302 and the upper core 303 are combined with the adhesive tape 701, and then vertically inverting the transformer that is the combined product, thereafter, installing the transformer 206 in a predetermined case (not illustrated), poring and curing the filler 403A, and filling the closed magnetic path regions 403 with the filler 403A to fix the bobbin 301. In this case, since the transformer 206 generates heat not only in the upper and lower cores 302 and 303 but also in the windings 401 and 402, the entire transformer 206 is housed in a predetermined case, and the inside of the case is filled with potting made of silicone resin or the like, to release heat of the winding 401 and 402 and the upper and lower cores 302 and 303 to the cooling apparatus 305 or the like below the transformer through the potting.

Modified Embodiment 3

Figure 14:
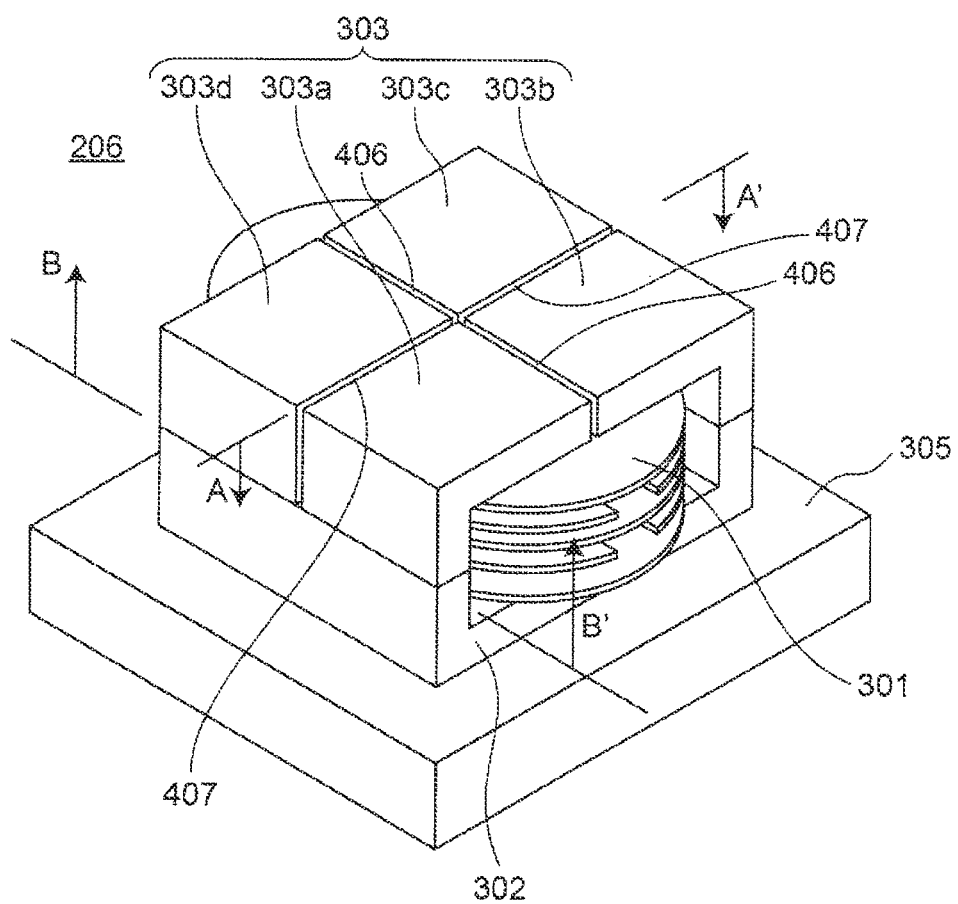
FIG. 14 is a perspective view illustrating an appearance of a configuration example of a transformer 206C according to modified embodiment 3, the transformer 206C including a lower core 302 which is one U-shaped core and an upper core 303 which is an E-shaped core including core portions 303a, 303b, 303c, and 303d obtained by dividing the upper core 303 into four portions.

FIG. 14 is a perspective view illustrating an appearance of a configuration example of a transformer 206C according to modified embodiment 3, the transformer 206C including a lower core 302 which is one U-shaped core and an upper core 303 which is an E-shaped core including core portions 303a, 303b, 303c, and 303d obtained by dividing the upper core 303 into four portions.

Referring to FIG. 14, the upper core 303 is divided into four core portions 303a, 303b, 303c, and 303d each having a rectangular end face shape. In this case, gaps 406, 406 are interposed between the core portion 303a and the core portion 303b and between the core portion 303c and the core portion 303d, respectively. In addition, gaps 407 and 407 are interposed between the core portion 303a and the core portion 303c and between the core portion 303b and the core portion 303d, respectively.

In the embodiment of FIG. 3, the gap 406 relaxes the stress with respect to the line A-A' direction. On the other hand, modified embodiment 3 has a specific effect that not only the gaps 406 and 406 relax the stress with respect to the line A-A', but also the gaps 407 and 407 relax the stress with respect to the direction orthogonal to the line A-A' direction.

It is noted that, in modified embodiment 3, the upper core 303 is divided into four portions, but for example, the upper core 303 may be divided into three portions at intervals of 120 degrees around the central portion of the transformer 206. Similarly, the upper core 303 may be divided into five or more portions around the central portion of the transformer 206.

Other Modified Embodiments

In the above embodiment, the primary winding 401 is an upper winding, and the secondary winding 402 is a lower winding. However, the present disclosure is not limited to this, and the same effect can be obtained by interchanging the primary winding 401 and the secondary winding 402 or by disposing the primary winding 401 inside and the secondary winding 402 outside or vice versa with respect to the inner legs.

The primary winding 401 and the secondary winding 402 may be copper wires, litz wires, or triple insulated winding wires (TIW).

INDUSTRIAL APPLICABILITY

The transformers 206, 206A, 206B, and 206C according to the present disclosure are not limited to the DC to DC converter 105 of the charging apparatus 101 in FIG. 1 that supplies a charging voltage to the rechargeable battery 106 and can also be used for various power supply apparatuses that supply a predetermined power supply voltage to a load.

The invention claimed is:

1. A transformer comprising:
a primary winding;
a secondary winding;
a bobbin on which both the primary winding and the secondary winding are wound, the primary and secondary windings facing each other in a first direction which is an up and down direction;
a first core; and
a second core, wherein:
the first core includes one first core portion,
the second core includes a plurality of second core portions,
the first core is a lower core,
the second core is an upper core,
the first core and the second core are disposed to face each other with a gap interposed between the first core and the second core,
the plurality of second core portions are disposed side by side in a second direction perpendicular to the first direction, and
the bobbin is disposed to be inserted into the one first core portion and the plurality of second core portions.

2. The transformer as claimed in claim 1, wherein the first core and the second core include a heat-resistant elastic body in the gap, and are disposed to face each other.

3. The transformer as claimed in claim 1, wherein each of the second core portions is disposed with a heat-resistant elastic body interposed between the second core portions.

4. The transformer as claimed in claim 1, wherein the first core and the second core are adhered to each other and disposed to face each other.

5. The transformer as claimed in claim 1, wherein the first core and the second core are fixed to each other by an adhesive tape in a state where the first core and the second core are disposed to face each other.

6. The transformer as claimed in claim 1, further comprising a cooling apparatus provided below the first core.

7. The transformer as claimed in claim 1, wherein the first core portion is an E-shaped core, and wherein each of the second core portions is a U-shaped core.

8. The transformer as claimed in claim 1, wherein the first core portion is an I-shaped core, and wherein each of the second core portions is a U-shaped core.

9. The transformer as claimed in claim 1, wherein the first core portion is a T-shaped core, and wherein each of the second core portions is an L-shaped core.

10. The transformer as claimed in claim 1, wherein the first core and the second core are disposed to face each other in the first direction.

11. A charging apparatus that supplies a charging voltage to a rechargeable battery, the charging apparatus comprising a transformer,
wherein the transformer comprises:
a primary winding;
a secondary winding;
a bobbin on which both the primary winding and the secondary winding are wound, the primary and secondary windings facing each other in a first direction which is an up and down direction;
a first core; and
a second core, wherein:
the first core includes one first core portion,
the second core includes a plurality of second core portions,
the first core is a lower core,
the second core is an upper core,
the first core and the second core are disposed to face each other with a gap interposed between the first core and the second core,
the plurality of second core portions are disposed side by side in a second direction perpendicular to the first direction, and
wherein the bobbin is disposed to be inserted into the one first core portion and the plurality of second core portions.

12. The charging apparatus claimed in claim 11, wherein the first core and the second core are disposed to face each other in the first direction.

13. A power supply apparatus that supplies a power supply voltage to a load, the power supply apparatus comprising a transformer,
wherein the transformer comprises:
a primary winding;
a secondary winding;
a bobbin on which both the primary winding and the secondary winding are wound, the primary and secondary windings facing each other in a first direction which is an up and down direction;
a first core; and
a second core, wherein:
the first core includes one first core portion,
the second core includes a plurality of second core portions,
the first core is a lower core,
the second core is an upper core,
the first core and the second core are disposed to face each other with a gap interposed between the first core and the second core,
the plurality of second core portions are disposed side by side in a second direction perpendicular to the first direction, and
wherein the bobbin is disposed to be inserted into the one first core portion and the plurality of second core portions.

14. The power supply apparatus as claimed in claim 13, wherein the first core and the second core are disposed to face each other in the first direction.

15. A method of manufacturing a transformer, the transformer comprising:
a primary winding;
a secondary winding;
a bobbin;
a first core; and
a second core, wherein:
the first core includes one first core portion,
the second core includes a plurality of second core portions,
the first core is a lower core,
the second core is an upper core, and
the method comprises steps of:
winding both of the primary winding and the secondary winding to face each other in a first direction which is an up and down direction, into the bobbin;
disposing the first core and the second core to face each other, with a gap interposed between the first core and the second core,
disposing the plurality of second core portions side by side in a second direction perpendicular to the first direction, and
disposing the bobbin to be inserted into the one first core portion and the plurality of second core portions.

16. The method of manufacturing a transformer as claimed in claim 15,
wherein the step of disposing the first core such that the first core faces the second core includes adhering the first core and the second core to each other and disposing the first core and the second core so that the first core and the second core face each other.

17. The method of manufacturing a transformer as claimed in claim 15,
wherein the step of disposing the first core such that the first core faces the second core includes fixing the first core and the second core to each other with an adhesive tape in a state where the first core and the second core are disposed to face each other.

18. The method of manufacturing a transformer as claimed in claim 15, wherein the first core and the second core are disposed to face each other in the first direction.

* * * * *